(12) United States Patent
Nicolas

(10) Patent No.: US 10,890,506 B2
(45) Date of Patent: Jan. 12, 2021

(54) CONNECTION END FITTING OF A FLEXIBLE LINE, MEASUREMENT DEVICE FOR MEASURING THE INTEGRITY OF THE LINE, AND METHOD OF MEASURING THE INTEGRITY OF THE LINE WITH THE MEASUREMENT DEVICE

(71) Applicant: TECHNIP FRANCE, Courbevoie (FR)

(72) Inventor: Yann Nicolas, Rueil Malmaison (FR)

(73) Assignee: TECHNIP FRANCE

( * ) Notice: Subject to any disclaimer, the term of this patent is extended or adjusted under 35 U.S.C. 154(b) by 130 days.

(21) Appl. No.: 16/064,233

(22) PCT Filed: Dec. 30, 2016

(86) PCT No.: PCT/EP2016/082906
§ 371 (c)(1),
(2) Date: Jun. 20, 2018

(87) PCT Pub. No.: WO2017/114942
PCT Pub. Date: Jul. 6, 2017

(65) Prior Publication Data
US 2019/0003921 A1 Jan. 3, 2019

(30) Foreign Application Priority Data
Dec. 31, 2015 (FR) .................................... 15 63502

(51) Int. Cl.
*G01M 5/00* (2006.01)
*F16L 11/08* (2006.01)
*F16L 33/01* (2006.01)

(52) U.S. Cl.
CPC ......... *G01M 5/0025* (2013.01); *F16L 11/083* (2013.01); *F16L 33/01* (2013.01); *G01M 5/0033* (2013.01); *G01M 5/0066* (2013.01)

(58) Field of Classification Search
CPC ........ F16L 2201/30; F16L 11/00; G01M 3/04; G01M 3/183; G01M 3/085; G01M 3/2815;
(Continued)

(56) References Cited

U.S. PATENT DOCUMENTS 3,902,745 A * 9/1975 Mooney ................... F16L 33/24
                                                                  285/247
4,448,062 A    5/1984 Peterson et al. .................. 73/86
(Continued)

FOREIGN PATENT DOCUMENTS

EP     0 415 848 A1    3/1991
FR     3 016 422 A1    7/2015
(Continued)

OTHER PUBLICATIONS

International Search Report dated Mar. 20, 2017 in corresponding PCT International Application No. PCT/EP2016/082906.
(Continued)

*Primary Examiner* — Tran M. Tran
(74) *Attorney, Agent, or Firm* — Ostrolenk Faber LLP

(57) ABSTRACT

An end fitting including an end part of the tubular sheath, an end section of each elongate element, an end vault, and a cover defining a chamber for receiving each end section. The end fitting includes at least one transducer for generating an ultrasonic wave guided in the elongate element, the generation transducer being placed on the elongate element in the receiving chamber, the generation transducer having a volume of less than 200 mm$^3$, in particular comprised between 20 mm$^3$ and 50 mm$^3$.

19 Claims, 7 Drawing Sheets

(58) Field of Classification Search
CPC ........ G01M 3/2853; G01M 3/22; G01M 3/18; G01M 3/246; G01M 3/243; F17D 5/06; B06B 1/0622; G01N 29/041
See application file for complete search history.

(56) References Cited

U.S. PATENT DOCUMENTS

| | | | | |
|---|---|---|---|---|
| 4,609,994 A * | 9/1986 | Bassim | ............... | G01N 29/14 702/39 |
| 4,775,855 A * | 10/1988 | Cox | ............... | F17D 5/04 137/552.7 |
| 5,499,848 A * | 3/1996 | Kujawski | ............... | F16L 37/0987 285/93 |
| 5,639,128 A * | 6/1997 | Belcher | ............... | F16L 33/01 285/222.1 |
| 5,654,499 A * | 8/1997 | Manuli | ............... | F16L 11/12 138/104 |
| 5,860,682 A * | 1/1999 | Belcher | ............... | F16L 33/01 285/222.1 |
| 5,969,618 A * | 10/1999 | Redmond | ............... | G01M 3/18 174/11 R |
| 6,019,137 A * | 2/2000 | Secher | ............... | F16L 33/01 137/601.01 |
| 6,037,767 A * | 3/2000 | Crescenzo | ............... | G01N 27/82 324/220 |
| 6,065,350 A * | 5/2000 | Hill | ............... | G01D 5/48 73/861.27 |
| 6,360,781 B1 * | 3/2002 | Braad | ............... | F16L 25/08 138/109 |
| 6,592,153 B1 * | 7/2003 | Belcher | ............... | F16L 33/01 285/222.2 |
| 6,634,387 B1 * | 10/2003 | Glejbøl | ............... | E21B 17/01 138/104 |
| 6,679,298 B2 * | 1/2004 | Espinasse | ............... | F16L 11/08 138/119 |
| 6,923,477 B2 * | 8/2005 | Buon | ............... | F16L 33/003 138/109 |
| 7,234,492 B2 * | 6/2007 | Bastard | ............... | F16L 57/02 138/114 |
| 7,318,454 B2 * | 1/2008 | Dupoiron | ............... | F15D 1/065 138/135 |
| 7,631,667 B2 * | 12/2009 | Brink | ............... | F16L 33/28 138/104 |
| 7,963,165 B2 * | 6/2011 | Sinha | ............... | G01N 29/02 73/596 |
| 8,096,589 B2 * | 1/2012 | De Aquino | ............... | F16L 33/01 285/290.2 |
| 8,100,150 B2 * | 1/2012 | Jung | ............... | F16L 11/16 138/136 |
| 8,289,173 B2 * | 10/2012 | Ben-Mansour | ............... | G01M 3/183 340/572.8 |
| 8,387,461 B2 * | 3/2013 | Marsden | ............... | F16L 11/082 73/623 |
| 8,439,404 B2 * | 5/2013 | Anton | ............... | F16L 19/061 285/93 |
| 8,441,361 B2 * | 5/2013 | McAlister | ............... | B01J 19/127 340/605 |
| 8,515,687 B2 * | 8/2013 | Pereira | ............... | G01M 5/0083 702/34 |
| 8,547,539 B2 * | 10/2013 | Ramos | ............... | G01M 5/0025 356/73.1 |
| 8,746,041 B2 * | 6/2014 | Howard | ............... | G01M 3/04 73/40.5 R |
| 8,891,070 B2 * | 11/2014 | Weppenaar | ............... | E21B 47/0006 356/32 |
| 9,010,810 B2 * | 4/2015 | Anton | ............... | F16L 19/061 285/93 |
| 9,080,922 B2 * | 7/2015 | Howard | ............... | G01M 3/04 |
| 9,134,278 B2 * | 9/2015 | Klopffer | ............... | F16L 11/083 |
| 9,188,256 B2 * | 11/2015 | Kristiansen | ............... | F16L 11/08 |
| 9,217,526 B2 * | 12/2015 | Eccleston | ............... | F16L 11/12 |
| 9,327,317 B2 * | 5/2016 | Hynynen | ............... | A61N 7/02 |
| 9,389,137 B2 * | 7/2016 | Millet | ............... | G01M 3/045 |
| 9,395,023 B2 * | 7/2016 | Graham | ............... | F16L 11/02 |
| 9,400,070 B2 * | 7/2016 | Anton | ............... | F16L 19/061 |
| 9,400,227 B2 * | 7/2016 | Ramos | ............... | E21B 17/015 |
| 9,448,209 B2 * | 9/2016 | Klopffer | ............... | F16L 11/083 |
| 9,534,713 B2 * | 1/2017 | Castel | ............... | F16L 11/083 |
| 9,588,074 B2 * | 3/2017 | Demanze | ............... | G01M 3/40 |
| 9,618,419 B2 * | 4/2017 | Demanze | ............... | G01M 3/283 |
| 9,658,421 B2 * | 5/2017 | Do | ............... | F16L 11/083 |
| 9,784,716 B2 * | 10/2017 | Keyworth | ............... | G01N 29/04 |
| 9,939,115 B2 * | 4/2018 | Reck | ............... | G01M 5/0025 |
| 9,958,354 B2 * | 5/2018 | Clements | ............... | G01N 3/12 |
| 9,972,766 B2 * | 5/2018 | Yamashita | ............... | H01L 41/41 |
| 9,989,183 B2 * | 6/2018 | Glejbol | ............... | F16L 11/127 |
| 10,088,079 B2 * | 10/2018 | Moller Andersen | .... | F16L 33/01 |
| 10,113,677 B2 * | 10/2018 | Bourget | ............... | F16L 33/01 |
| 10,295,093 B2 * | 5/2019 | Anton | ............... | F16L 19/061 |
| 10,326,072 B2 * | 6/2019 | Toda | ............... | H01L 41/22 |
| 10,408,795 B2 * | 9/2019 | Nicolas | ............... | G01N 29/4427 |
| 10,451,206 B2 * | 10/2019 | Espinasse | ............... | F16L 33/2078 |
| 2005/0072215 A1 * | 4/2005 | Booles | ............... | G01M 3/283 73/40.5 R |
| 2007/0206440 A1 * | 9/2007 | Fripp | ............... | E21B 47/007 367/157 |
| 2013/0231528 A1 * | 9/2013 | Voic | ............... | A61B 1/3132 600/104 |
| 2015/0292663 A1 * | 10/2015 | Glejbol | ............... | F16L 33/01 285/255 |
| 2016/0290539 A1 * | 10/2016 | Nielsen | ............... | F16L 33/01 |
| 2018/0128404 A1 * | 5/2018 | Gray | ............... | F16L 33/01 |
| 2018/0283588 A1 * | 10/2018 | Gray | ............... | F16L 11/083 |
| 2019/0003921 A1 * | 1/2019 | Nicolas | ............... | G01M 5/0025 |

FOREIGN PATENT DOCUMENTS

WO    WO 2013/149983 A1    10/2013
WO    WO 2016/042487 A2    3/2016

OTHER PUBLICATIONS

Written Opinion dated Mar. 20, 2017 in corresponding PCT International Application No. PCT/EP2016/082906.
Preliminary Search Report dated Aug. 19, 2016 in corresponding French Patent Application No. 1563502.

* cited by examiner

CONNECTION END FITTING OF A FLEXIBLE LINE, MEASUREMENT DEVICE FOR MEASURING THE INTEGRITY OF THE LINE, AND METHOD OF MEASURING THE INTEGRITY OF THE LINE WITH THE MEASUREMENT DEVICE

CROSS-REFERENCE TO RELATED APPLICATIONS

The present application is a 35 U.S.C. §§ 371 national phase conversion of PCT/EP2016/082906, filed Dec. 30, 2016, which claims priority to French Patent Application No. 15 63502, filed Dec. 31, 2015, the contents of which are incorporated herein by reference. The PCT International Application was published in the French language.

TECHNICAL FIELD

The present invention relates to a connection end fitting of a flexible line, the flexible line comprising at least one tubular sheath and at least one elongate element arranged around the tubular sheath, the end fitting comprising an end part of the tubular sheath, an end section of each elongate element, an end vault and a cover defining a chamber for receiving each end section.

BACKGROUND OF THE INVENTION

The flexible line is in particular a flexible pipe of the unbonded type designed to transfer hydrocarbons through an body of water, such as an ocean, sea, lake or river.

Such a flexible pipe is for example made according to normative documents API 17J (Specification for Unbonded Flexible Pipe) and API RP 17B (Recommended Practice for Flexible Pipe) established by the American Petroleum Institute.

The pipe is generally formed by a set of concentric and superimposed layers. It is considered "unbonded" within the meaning of the present invention when at least one of the layers of the pipe is able to move longitudinally relative to the adjacent layers when the pipe is bent. In particular, an unbonded pipe is a pipe with no bonding materials connecting the layers forming the pipe.

The pipe is generally positioned through an body of water, between a bottom assembly, designed to collect the fluid mined in the bottom of the body of water, and a floating surface assembly designed to connect and distribute the fluid. The surface assembly may be a semisubmersible platform, an FPSO or another floating assembly.

In a known manner, such a pipe includes a tubular inner structure comprising at least one pressure sheath. The pipe includes plies of tensile armor positioned around the inner tubular structure.

In some cases, for the exploitation of fluids in deep water, the flexible pipe has a length exceeding 800 m. The ends of the pipe have end fittings for connecting to the bottom assembly and the surface assembly.

These pipes undergo very high axial tensile forces, in particular when the body of water in which the pipe is positioned is very deep.

In that case, the upper end fitting connecting the pipe to the surface assembly must react a very significant axial tension, which may reach several hundreds of tons. These forces are transmitted to the end fitting by means of plies of tensile armor extending along the pipe.

The armor elements of the pipes are particularly stressed during the lifetime of the pipe. This is in particular the case at the end fittings, where these elongate elements making up the armors are anchored, while being embedded in a mass of resin.

The integrity of the plies of tensile armors is therefore essential to the lifetime of the pipe. If defects appear on the armor elements, they may cause weaknesses of some of the elements, or even mechanical breaks, which can have very harmful consequences on the holding of the pipe.

To solve this problem, EP 0,415,848 describes a method for monitoring a flexible tubular pipe in which acoustic sensors are arranged on the outer sheath, or in the latter, to listen to the acoustic signals emitted by the armor wires when they rub against one another.

Such a technique has the advantage of being able to determine particular events occurring on the armor wires, such as the generation of breaks.

However, these sensors are passive and do not allow an active analysis of the defects, at any moment, since it is necessary to monitor the events occurring on the pipe continuously.

SUMMARY OF THE INVENTION

One aim of the invention is to allow effective monitoring of the integrity of elongate elements present on a flexible pipe, actively and individually, in order to monitor the occurrence of mechanical weaknesses on these elements.

To that end, the invention relates to an end fitting of the aforementioned type, characterized in that the end fitting includes at least one transducer for generating an ultrasonic wave guided in the elongate element, the generation transducer being placed on the elongate element in the receiving chamber, the generation transducer having a volume of less than 200 mm$^3$, in particular comprised between 20 mm$^3$ and 50 mm$^3$.

The end fitting according to the invention may include one or more of the following features, considered alone or according to any technically possible combination(s):
- the generation transducer has a thickness, considered relative to the sheath, of less than 2 mm, advantageously less than $\frac{1}{10}$ mm;
- a filler material of the receiving chamber, the filler material being in contact with the end section of the elongate element and covering the generation transducer;
- an armor ply, the elongate element being an armor element of the armor ply;
- an inner armor ply at least one outer armor ply, the end fitting comprising at least one inner end section of at least one armor element of the inner armor ply, and at least one outer end section of at least one armor element of the outer armor ply;
- the end fitting comprising a first generation transducer of a guided ultrasonic wave applied on the inner end section, and a second generation transducer of a guided ultrasonic wave applied on the outer end section;
- the generation transducer is glued on the end section of the elongate element;
- the generation transducer is covered by a layer of protective material with a thickness of less than 50% of the thickness of the generation transducer;
- the end section of the elongate element comprises at least one side face and at least one edge located at the free end of the end section, the generation transducer being applied on the side face and/or on the edge;

the end section of the elongate element comprises a hook, twist and/or wave, the generation transducer being located on the hook, twist and/or wave;

the generation transducer is fastened on a planar surface;

several end sections of separate elongate elements, the end fitting further comprising several generation transducers of a guided ultrasonic wave, each applied on a separate elongate element;

the generation transducer is able to emit a guided ultrasonic wave with a frequency comprised between 10 kHz and 5 MHz, advantageously between 50 kHz and 500 kHz;

the generation transducer is chosen from among a piezoelectric transducer, advantageously a piezoelectric membrane transducer, a variable-angle transducer, an interdigital transducer and/or an excited comb transducer, an EMAT transducer and/or a magnetostrictive effect transducer.

a visual inspection window is arranged in the thickness of a rear part of the cover, across from at least one elongate element and/or a rear blocking collar of the or each elongate element.

The invention also relates to a device for measuring the integrity of an elongate element in a flexible line, comprising:

an end fitting as defined above;

at least one transducer for receiving the guided ultrasonic wave emitted by the generation transducer, advantageously formed by the generation transducer, a signal generator, connected to the or each generation transducer and a signal detector, connected to the receiving transducer.

The invention also relates to a method for measuring the integrity of at least one flexible line, comprising the following steps:

providing a device as defined above;

generating a guided wave using the generating transducer in an elongate element of the flexible line;

receiving a signal captured by the reception transducer of the elongate element;

processing the received signal to determine the presence of defects in the elongate element.

BRIEF DESCRIPTION OF THE DRAWINGS

The invention will be better understood upon reading the following description, provided solely as an example, and in reference to the appended drawings, in which.

DESCRIPTION OF PREFERRED EMBODIMENTS

Hereinafter, the terms "front" and "rear" are to be understood relative to the position of the middle of a flexible pipe section.

The term "rear" refers to closer to the middle of the flexible pipe section and further from an end of the flexible pipe section, while the term "front" refers to further from the middle of the flexible pipe section and closer to an end of the flexible pipe section.

The terms "outer" and "inner" respectively refer to radially further from the axis of the flexible pipe and radially closer to the axis of the flexible pipe.

Figure 2:
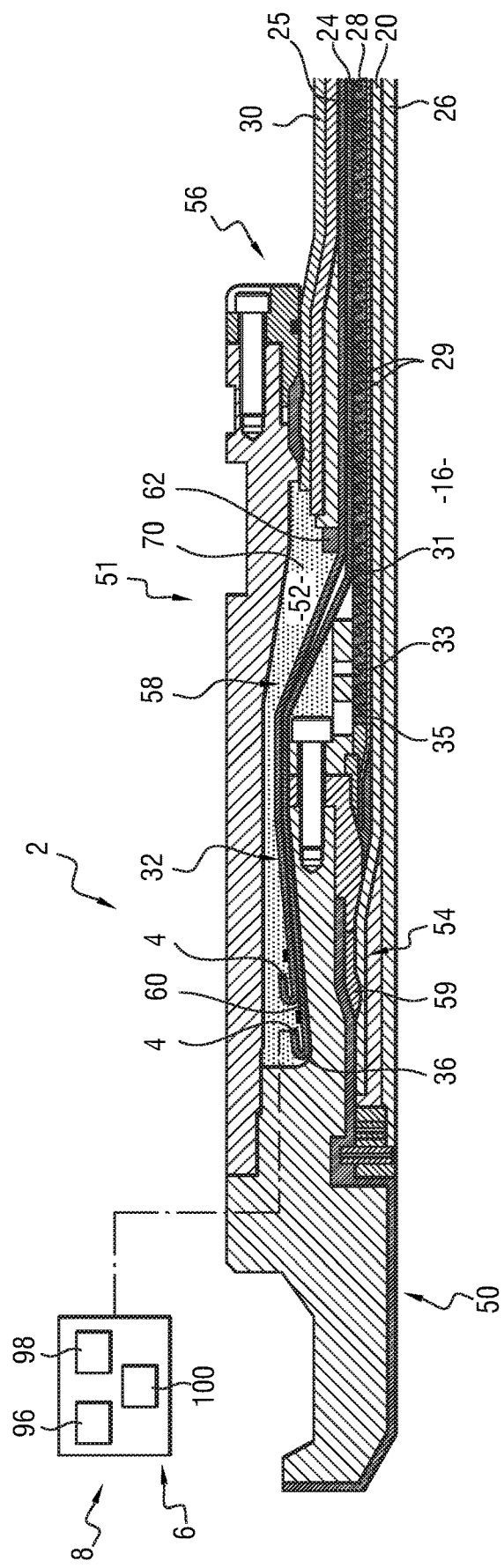
FIG. 2 is a partial sectional view of a first end fitting according to the invention.
Figure 5:
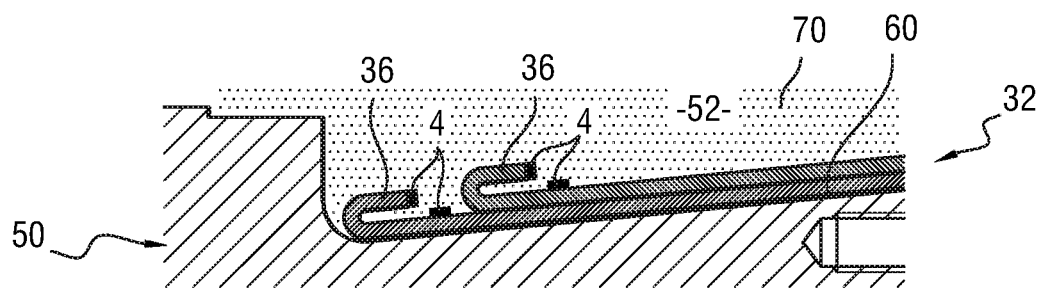
FIG. 5 is a view of a detail of FIG. 2, illustrating the positioning of the acoustic transducer.

A first instrumented end fitting 2 according to the invention of the flexible pipe 10 is illustrated by FIGS. 2 and 5. The instrumented end fitting 2 is provided with at least one transducer 4 for generating a guided ultrasonic wave in at least one elongate element of the flexible pipe 10.

As will be seen below, the instrumented end fitting 2 is connected to a defect detection unit 6 to form, with the instrumented end fitting 2, a device 8 for measuring the integrity of the elongate elements of the flexible pipe 10.

Figure 1:
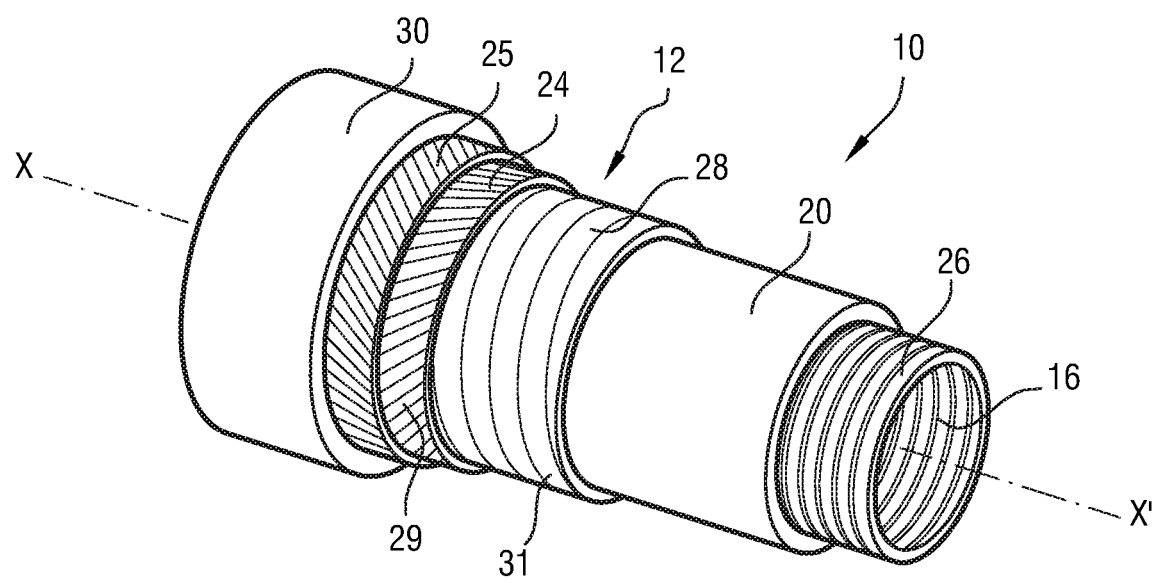
FIG. 1 is a partial cutaway perspective view of a central section of a flexible pipe intended to be connected to an end fitting according to the invention.

The flexible pipe 10 includes a central section 12 illustrated partially in FIG. 1. It includes, at each of the axial ends of the central section 12, an end fitting 2 (not shown in FIG. 1), the relevant parts of which are shown in FIG. 2. At least one end fitting 2 of the pipe is instrumented.

In reference to FIG. 1, the pipe 10 defines a central passage 16 for the flow of a fluid, advantageously an oil fluid. The central passage 16 extends along an axis X-X', between the upstream end and the downstream end of the pipe 10. It emerges through the end fittings 2.

The flexible pipe 10 is designed to be positioned through a body of water (not shown) in a fluid exploitation facility, in particular for hydrocarbons.

The body of water is for example a sea, lake or ocean. The depth of the body of water at the fluid exploitation installation is for example comprised between 500 m and 3000 m.

The fluid exploitation installation includes a surface assembly, in particular floating, and a bottom assembly (not shown), that are generally connected to one another by the flexible pipe 10.

The flexible pipe 10 is preferably an unbonded pipe.

At least two adjacent layers of the flexible pipe 10 are free to move longitudinally relative to one another when the pipe bends. Advantageously, all of the layers of the flexible pipe are free to move relative to one another. Such a pipe is for example described in the normative documents published by the American Petroleum Institute (API), API 17J and API RP 17B.

As illustrated by FIG. 1, the pipe 10 delimits a plurality of concentric layers around the axis A-A', which extend continuously along the central section 12 up to the end fittings 2 situated at the ends of the pipe.

The pipe 10 includes at least one first tubular sheath 20 with a base of a polymer material advantageously forming a pressure sheath.

The pipe 10 further includes a plurality of tensile armor plies 24, 25 positioned outwardly relative to the first sheath 20.

Advantageously, and depending on the desired use, the pipe 10 further includes an inner carcass 26 positioned inside the pressure sheath 20, a pressure vault 28 inserted between the pressure sheath 20 and the tensile armor plies 24, 25, and an outer sheath 30, designed to protect the pipe 10.

In a known manner, the pressure sheath 20 is designed to tightly confine the fluid transported in the passage 16. It is made from a polymer material, for example with a base of a polyolefin such as polyethylene, a base of a polyamide such as PA11 or PA12, or a base of a fluorinated polymer such as polyvinylidene fluoride (PVDF).

The thickness of the pressure sheath 20 is for example comprised between 5 mm and 20 mm.

When the carcass 26 is present, it is formed by a profiled metal sheet, wound in a spiral. The turns of the sheet are advantageously stapled to one another, which makes it possible to react the radial crushing forces.

In this example, the carcass 26 is positioned inside the pressure sheath 20. The pipe is then designated by the term "rough bore" due to the geometry of the carcass 26.

In an alternative that is not shown, the flexible pipe 10 has no inner carcass 26, and is then referred to as "smooth bore".

The helical winding of the profiled metal sheet forming the carcass 26 has a short pitch, i.e., it has a spiral angle relative to the axis X-X' with an absolute value close to 90°, typically comprised between 75° and 90°.

In this example, the pressure vault 28 is designed to react the forces related to the pressure prevailing inside the pressure sheath 20. It is for example formed by a metal profiled wire 31 wound in a spiral around the sleeve 20. The profiled wire 31 generally has a complex geometry, in particular in the shape of a Z, T, U, K, X or I. The profiled wire 31 has an end part 33 arranged in the end fitting 2. The end part 33 is advantageously provided at its front end with a ring 35 in particular visible in FIG. 9.

The pressure vault 28 is wound in a spiral with a short pitch around the pressure sheath 20, i.e., with a spiral angle relative to the axis X-X' with an absolute value close to 90°, typically comprised between 75° and 90°.

In the example shown in FIG. 1, the flexible pipe 10 includes an inner armor ply 24, and an outer armor ply 25 around which the outer sheath 30 is positioned.

Each armor ply 24, 25 includes longitudinal armor elements 29 wound with a long pitch around the axis X-X' of the pipe.

"Wound with a long pitch" means that the absolute value relative to the axis X-X' of the spiral angle is less than 60°, and is typically comprised between 25° and 55°.

The armor elements 29 of a first ply 24 are generally wound with an opposite angle relative to the armor elements 29 of a second ply 25. Thus, if the winding angle of the armor elements 29 of the first ply 24 is equal to +α, α being comprised between 25° and 55°, the winding angle of the armor elements 29 of the second ply 25 positioned in contact with the first ply 24 is for example −α, with α comprised between 25° and 55°.

The armor elements 29 are for example formed by metal wires. Alternatively, the armor elements 29 are for example formed by metal wires or flat composite tapes filled with carbon fibers.

As shown in FIG. 2, the armor elements 29 each have an end section 32 inserted into the end fitting 2. The end section 32 extends to a free end positioned in the end fitting 2. It advantageously has a spiral or pseudo-spiral trajectory with axis X-X' in the end fitting 2.

Each end section 32 here has an attachment element 36 in the end fitting 2, for example a hook, twist and/or wave. In the example shown in FIG. 2 or 5, the attachment element 36 is a hook.

Figure 3:
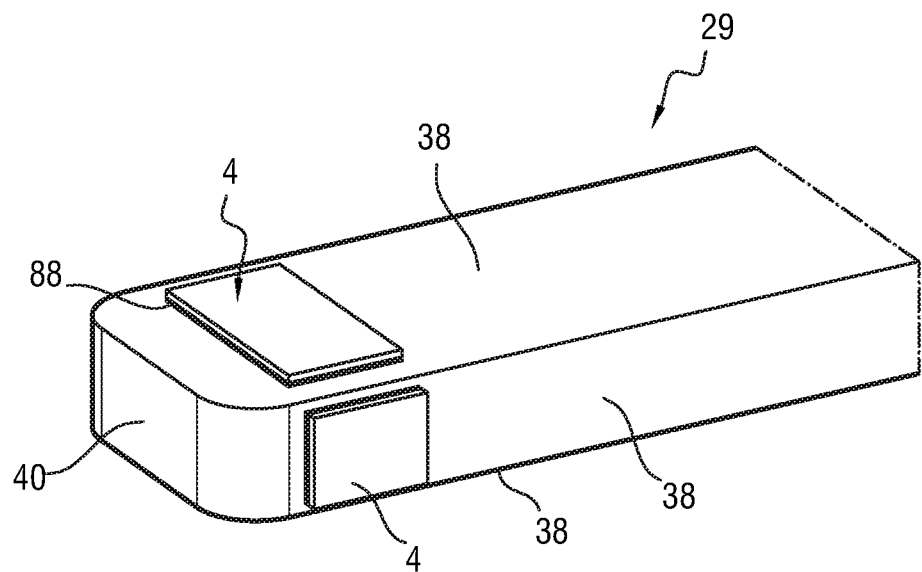
FIG. 3 is a view of a detail of the end section of an armor element of the end fitting of FIG. 2, equipped with acoustic transducers.
Figure 4:
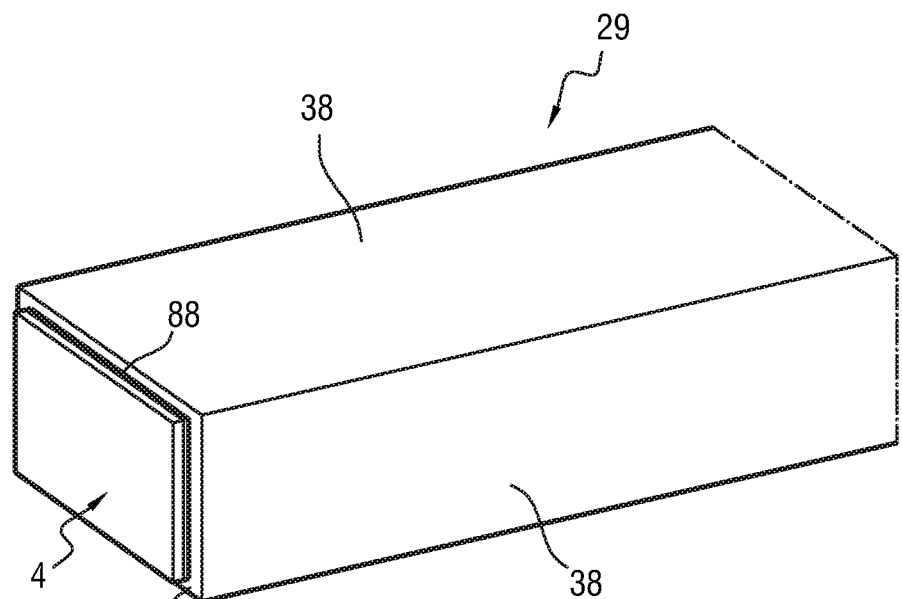
FIG. 4 is a view similar to FIG. 3 of another embodiment of an armor element according to the invention.

In this example, as illustrated by FIG. 3 or FIG. 4, each armor element 29 has at least one side face 38, advantageously more than three side faces 38, and an edge 40, extending transversely, at the free end of the armor element 29.

The armor element 29 thus has a parallelepiped cross-section, in particular rectangular. The cross-section is substantially constant over the entire length of the armor element 29.

The outer sheath 30 is designed to prevent the permeation of fluid from the outside of the flexible pipe toward the inside. It is advantageously made from a polymer material, in particular with a base of a polyolefin, such as polyethylene, a base of a polyamide, such as PA11 or PA12, or a base of a fluorinated polymer, such as polyvinylidene fluoride (PVDF).

The thickness of the outer sheath 30 is for example comprised between 5 mm and 15 mm.

As illustrated by FIG. 2, each end fitting 2 includes an end vault 50 and an outer connecting cover 51 protruding axially rearwards from the vault 50. The cover 51 delimits, with the end vault 50 and with an end part of the pressure sheath 20, a chamber 52 for receiving end sections 32 of the armor elements 29, and end parts 33 of the pressure vault 28.

The end fitting 2 further includes a front sealing assembly 54 around the pressure sheath 20, and a rear sealing assembly 56 around the outer sheath 30.

The end fitting 2 also comprises an assembly 58 for fastening layers of armor 24, 25 in the chamber 52.

In this example, the end vault 50 is designed to connect the pipe 10 to another connecting end fitting 2 or to terminal equipment, advantageously by means of an end flange (not shown).

The cover 51 delimits the chamber 52 radially toward the outside. It covers the outside of the end sections 32 of the armor plies 24, 25 and extends axially to the end parts 33 of the pressure vault 28 and extends axially to the rear sealing assembly 56.

The front sealing assembly 54 includes at least one crimping ring 59 of the pressure sheath 20.

The fastening assembly 58 includes a rear locking collar 62, pressed on the outer ply 25, and advantageously a solid filler material 70 of the chamber 52, embedding the end sections 32 of the plies 24, 25 and, if one is installed, the collar 62.

In this example, the instrumented end fitting 2 has a plurality of transducers 4 for generating guided ultrasonic waves, attached on a plurality of filiform elements made up of armor elements 29 of the armor plies 24, 25.

In particular, the instrumented end fitting 2 has at least a first generation transducer 4 arranged on an armor element 29 of the inner armor ply 24, preferably a plurality of first generation transducers 4 arranged on separate armor elements 29 of the inner armor ply 24.

Likewise, the instrumented end fitting 2 has at least a second generation transducer 4 arranged on an armor element 29 of the outer armor ply 25, preferably a plurality of second generation transducers 4 arranged on separate armor elements 29 of the outer armor ply 25.

Advantageously, each armor element 29 of each ply 24, 25 is provided with at least one generation transducer 4.

Each generation transducer 4 is arranged on an end section 32 of the armor element 29, in the chamber 52.

Each generation transducer 4 is arranged near the free end of the end section 32, in particular on the attachment element 36.

Each generation transducer 4 is preferably located on a planar surface, before or after the curved part of the attachment element 36.

Each generation transducer 4 is advantageously located axially across from an outer surface 60 of the vault 50 on which the end sections 32 rest.

In the example illustrated in FIG. 3, the generation transducers 4 are fastened on respective side faces 38 of the armor element 29 near the free end.

Alternatively or additionally, as illustrated by FIG. 4, at least one generation transducer 4 is fastened on the edge 40.

The fastening of each generation transducer 4 is advantageously done by gluing, in particular with a base of a thermoplastic glue such as a polyamide or cyanoacrylate glue, or with a base of a thermosetting glue such as an epoxy glue.

In the example shown in FIG. 2, each generation transducer 4 is covered by the hardened filler material 70 present in the chamber 52 in contact with the end section 32 of the armor element 29. In one alternative (not shown), the generation transducer 4 is covered by a layer of protective material with a thickness of less than 50% of the thickness of the generation transducer 4.

This protective material is for example made with a base of silicone.

To provide good compactness in the chamber 52, the generation transducer 4 has a total volume of less than 200 $mm^3$, in particular comprised between 20 $mm^3$ and 50 $mm^3$.

The generation transducer 4 is flat. It preferably has a thickness smaller than 2 mm, in particular comprised between 0.1 mm and 0.5 mm.

The length of the transducer 4 is for example comprised between 5 mm and 20 mm, and its width is comprised between 5 mm and 20 mm.

Each generation transducer 4 is able to create a guided ultrasonic wave or a train of guided ultrasonic waves, intended to propagate in the armor element 29.

The guided ultrasonic wave is able to be captured by a receiving transducer (not shown), which is for example a transducer separate from the generation transducer 4, placed at a distance from the latter, for example at least 1 m, in particular several meters on the same armor element 29, according to a so-called "pitch-catch" mode.

Alternatively, the receiving transducer is formed by the generation transducer 4, the guided wave being reflected by a defect and/or by an end of the armor element 29 to be captured again by the transducer 4, which works both as a transmitter and a receiver.

The arrival times of the reflected signal echoes indicate the relative distances. If a defect is encountered on the path of the wave, part of its energy will then be reflected, and an additional echo will appear earlier on the transducer 4.

The guided wave created by the generation transducer 4 is able to propagate in the armor element 29. The wave is guided by the geometry of the armor element 29 and propagates between the faces 38 of the armor element 29.

Given the symmetry properties, the nature and the dispersion of the waves, there is a finite number of propagation modes at a given frequency.

The energy is distributed in the thickness differently depending on the considered propagation mode. By connecting the energy of the wave with the amplitude of the movements, knowing the distribution of the energy of a mode of a guided wave in an armor element 29, fine defects located in the thickness in the locations where this energy is substantial will then be disruptive.

In an elongate element such as an armor element 29, three guided wave families are primarily susceptible to propagate.

A first mode propagates on the surface of the armor element 29 and constitutes Rayleigh waves. In this mode, the waves only disturb a material thickness of approximately the wavelength.

A second mode with a single component, constituting Love waves, corresponds to transverse waves, the polarization of which is perpendicular to the propagation plane. These waves are also called SH waves, because these are S waves (shear waves) with a horizontal polarization.

In the case of an armor element comprising an isotropic material, a third mode with three components may propagate in an armor element 29 and constitutes Lamb waves or plate waves. This family of modes has a polarization that is contained in the propagation plane.

The Lamb waves are modes specific to the armor element 29. These waves, of the P-SV type, result from the coupling between the longitudinal waves (L or P) and the transverse vertical waves (TV or SV).

These Lamb modes are classified in two families relative to the symmetries of the movement field in the thickness of the plate. The symmetric $S_n$ and anti-symmetric $A_n$ modes are therefore distinguished, the deformations of which are respectively symmetrical and anti-symmetrical in the thickness of the armor element 29. The index n is an integer that corresponds to the order of the propagation mode.

The propagation of the guided waves in each armor element 29 makes it possible to observe the conversions of the incident mode(s). The obstacles or defects that are embodied by more or less abrupt impedance changes favor certain mode conversions.

In general, a signal acquired by the reception transducer during an inspection contains contributions corresponding to the propagation of several modes, each mode having specific characteristics that are variable with the frequency.

The characteristic properties associated with each mode (phase speed, group speed) can be represented in the form of dispersion curves. The higher the frequency is, the higher the spatial resolution is and the better the detectability of small defects will be. However, the damping of the ultrasonic waves is faster and the examination distance becomes smaller.

In particular, the measurement of the energy transported by a Lamb wave is useful to obtain energy balances between the incident waves and those reflected or transmitted after a defect, for example.

The knowledge of the phase speeds is used for the recognition of the different waves present in the armor element in images showing the spatiotemporal evolutions of the normal movements.

Preferably, the generation transducer 4 creates a single (or preponderant) propagation mode that has a limited dispersion in the widest possible frequency range. The most appropriate propagation mode is chosen based on the geometry and dimensions of the defect that one wishes to detect, and its sensitivity to the geometric characteristics of the defect.

The choice of the propagation mode is associated with the choice of a frequency that may be comprised between 10 kHz and 5 MHz, in particular between 50 kHz and 5 MHz, advantageously between 50 kHz and 500 kHz.

The preponderant propagation mode is chosen based on its spatial distribution in the section, the energy flow transported to detect a defect located on the surface or in the core of the armor element 29.

Thus, the use of guided waves in the thickness of the material (Lamb and SH waves) is of great interest for the inspection of armor elements 29, since the guided waves allow a very quick inspection over several tens of meters of the presence of corrosion defects, cracks and breaks.

Surface waves are well suited for detecting small surface defects or quantifying the quality and nature of the interface between an armor element 29 and its environment, in particular for inspecting the interface with the filler material 70 in the end fitting 2, or the presence of water in the annular space between the pressure sheath 20 and the outer sheath 30.

Since the geometry of the armor element 29 guides the waves, the presence of an environmental variation at the interfaces of the armor element 29 is detectable. Based on the nature of the environment in contact with the interfaces of the armor element 29, the propagation rules for the guided waves at these interfaces are modified.

For example, if the annular space of the flexible line is flooded by seawater, the propagation of waves along a submerged armor element 29 will result in modifying their properties. The waves thus reflected toward the generation transducer will have a lower amplitude than those of the emitted waves. Part of the energy is transferred to the surrounding environment, the seawater in the case at hand.

The generation transducer 4 is preferably a piezoelectric transducer. In a first example, illustrated by FIG. 3 or FIG. 4, the generation transducer 4 is preferably a piezoelectric wafer 88 (PW) glued on the armor element 29. Such a wafer 88 in particular makes it possible to generate guided Rayleigh and Lamb waves in the armor element 29.

Figure 6:
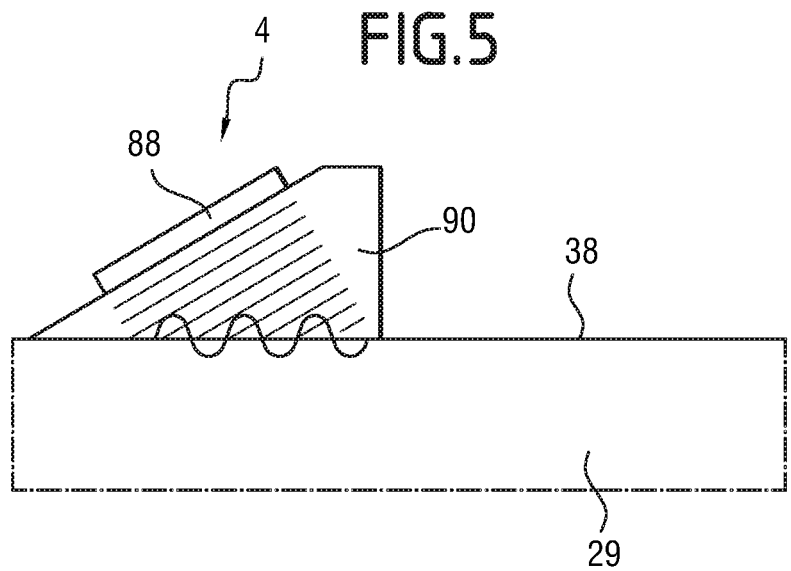
FIG. 6 is a schematic view of a transducer alternative applied on an armor element.

Alternatively, as illustrated by FIG. 6, a patch 90 of plastic material, for example Plexiglas, is inserted between the wafer and the face 38 of the armor element 29. The wafer 88 is thus inclined by a nil angle relative to the surface of the patch 90, while the surface of the patch 90 is in turn inclined by a non-nil angle, preferably greater than 0° and at most equal to 70° relative to the side face 38 of the armor element 29. Such an arrangement also makes it possible to generate guided Rayleigh and Lamb waves in the armor element 29.

Alternatively (not shown), the generation transducer 4 is a variable-angle transducer.

Figure 7:
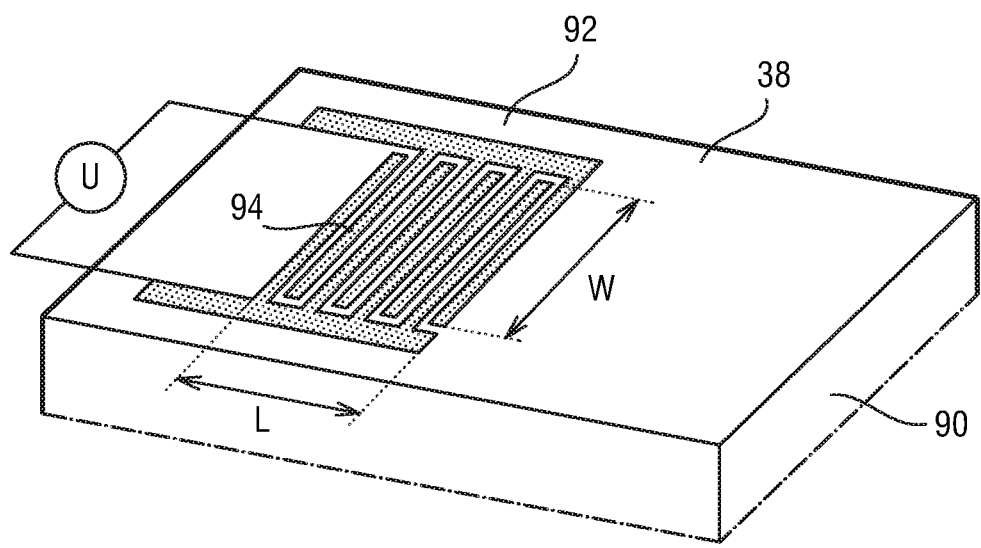
FIG. 7 is a schematic view of another transducer alternative applied on an armor element.

In the alternative shown in FIG. 7, the generation transducer 4 is an interdigital transducer 92. This transducer 92 comprises parallel electrodes 94 in the form of fingers arranged parallel to one another, with a first group of electrodes connected to a first terminal of an excitation source and a second group of electrodes connected to a second terminal of an excitation source. The electrodes 94 are preferably printed on a plastic film of the PVDF type or on a piezocomposite sheet. This transducer also makes it possible to generate guided Rayleigh and Lamb waves in the armor element 29.

In another alternative (not shown), the generation transducer 4 comprises piezoelectric elements in strip form. It is referred to by the term "excited comb" according to an appropriate vibration mode (longitudinal or transverse).

Alternatively, the generation transducer 4 is an electromagnetic acoustic transducer referred to by the acronym "EMAT".

This transducer works by Lorentz force or by magnetostrictive effect directly in the armor element 29.

Also alternatively, the generation transducer 4 is a magnetostrictive effect transducer using a patch of magnetostrictive materials (primarily nickel patch) glued directly on the armor element 29 and outwardly excited by a winding with an appropriate shape and dimensions supplied by a high-intensity electrical current generator.

In reference to FIG. 2, the defect detection unit 6 comprises a signal generator 96, connected to each generation transducer 4 to excite the generation transducer 4 and generate the guided waves, a signal detector 98, connected to each receiving transducer, to capture the signal received by the receiving transducer, and a computer 100 for processing the received signal.

The signal generator 96 is able to generate at least two types of signals. A first type of signal comprises pulses able to generate pulses with a voltage able to reach up to 200 V, with a very short duration (<0.1 pts). A second type of signal consists of trains of signals, advantageously sinusoidal, with a duration able to reach up to several hundreds of cycles and a defined frequency, for example comprised between 10 kHz and 5 MHz. The longer the train of signals is (up to several hundred periods), the more substantial the transported energy becomes.

As previously indicated, the excitation frequency is comprised between 10 kHz and 5 MHz, in particular between 50 kHz and 5 MHz, advantageously between 50 kHz and 500 kHz.

The signal detector 98 is connected to the receiving transducer to capture the received signal, either directly during a propagation between the generation transducer 4 and the receiving transducer placed separated therefrom, or received by reflection, when the receiving transducer is made up of the generation transducer 4.

The processing computer 100 is able to process the temporal signals received from the signal detector 98. The processing computer 100 is for example able to perform a transform to distinguish the wave packets that move at different speeds, to obtain a time-frequency representation, for example by Fourier transform. This processing for example comprises sliding a temporal window on the signal and, for each position of the window, computing the Fourier transform. The guided modes generally appear in the form of tasks in such a representation.

To identify the modes present in a signal, the processing computer 100 is advantageously able to perform a double spatiotemporal Fourier transform. To that end, the signal captured by the signal detector 98 undergoes two successive Fourier transforms, temporal, then spatial.

The resulting signal is then expressed as a function of the number of waves $k_z$ and the frequency f. The obtained representation perfectly separates the different modes present and the comparison with the dispersion curves linking the wave numbers and frequency makes it possible to identify the modes. This processing is called "all-frequency" and characterizes the modes present, which makes it possible to deduce any defects therefrom by mode change.

In one alternative, the processing computer 100 is able to extract information on the waves propagating along armor elements 29, by performing processing by "wavelets". The wavelets are parts of the detected signal that correspond, for each one, to frequency content. The processing computer 100 is thus able to break the signal down into wavelets. The interest of this transform lies in breaking the signals down in a time-frequency space. The signals of the generated waves, which may then mix, can separate in this space if the speeds of the waves are different, which is generally the case for the guided waves.

A method for mounting an instrumented end fitting 2 according to the invention will now be described.

Initially, after manufacturing the central section 12 of the flexible pipe 10, the end of the outer sheath 30 is cut to expose the end sections 32 of the armor elements 29 of each armor ply 24, 25.

In this configuration, the cover 51 and the elements of the rear sealing assembly 56 are cleared around the outer sheath 30, behind the end sections 32.

Then, the armor elements 29 are raised to make it possible to engage the end vault 50 and the elements of the front sealing assembly 54.

The attachment elements 36, here hooks, are then made at the free end of each armor element 29.

The generation transducers 4 are then provided. Each generation transducer 4 is applied on a side face 38 of an armor element 29 and/or on the edge 40 of the armor element 29. The generation transducer 4 is fastened by gluing on the armor element 29.

At least one armor element 29 of the inner ply 24 and at least one armor element 29 of the outer ply 25 are equipped with a generating transducer 4. Preferably, a plurality of armor elements 29 of the inner ply 24 and a plurality of armor elements of the outer ply 25 are each equipped with at least one generation transducer 4.

Advantageously, all of the armor elements 29 are equipped with at least one generation transducer 4.

The transducers 4 are next connected, for example in a wired manner, to the defect detection unit 6.

Next, the front sealing assembly 54 is placed to crimp the pressure sheath 20. The armor elements 29 are then folded toward the front to be pressed against the outer surface 60 of the end vault 50.

The cover 51 is moved forward to be mounted on the end vault 50 and close the receiving chamber 52. The rear sealing assembly 56 is then placed to crimp the outer sheath 30.

Then, filler material 70 is poured in the chamber 52 to fill the chamber 52. The material embeds the end sections 32 of the armor elements 29 and covers the generation transducers 4.

The generation transducers 4 having a small steric bulk, and a limited thickness, they do not disrupt the pouring of the filler material 70 and the fastening of the end sections 32 of the armor elements 29 in the receiving chamber 52 of the end fitting 2.

A method for measuring the integrity of the armor elements 29 of a flexible pipe 10, carried out using an instrumented end fitting 2 according to the invention, will now be described.

Initially, the flexible pipe 10, provided with at least one instrumented end fitting 2, is provided. The signal generator 96 of the defect detection unit 6 is connected to the generation transducer 4 arranged in the instrumented end fitting 2.

At regular intervals, for example at a frequency comprised between 10 kHz and 5 MHz, the signal generator 96 is activated to create impulses able to generate pulses, with a short duration or trains of signals with a duration able to reach up to several hundreds of cycles.

The frequency of the signals 96 is preferably comprised between 10 kHz and 5 MHz, in particular between 50 kHz and 5 MHz, advantageously between 50 kHz and 500 kHz.

Figure 8:
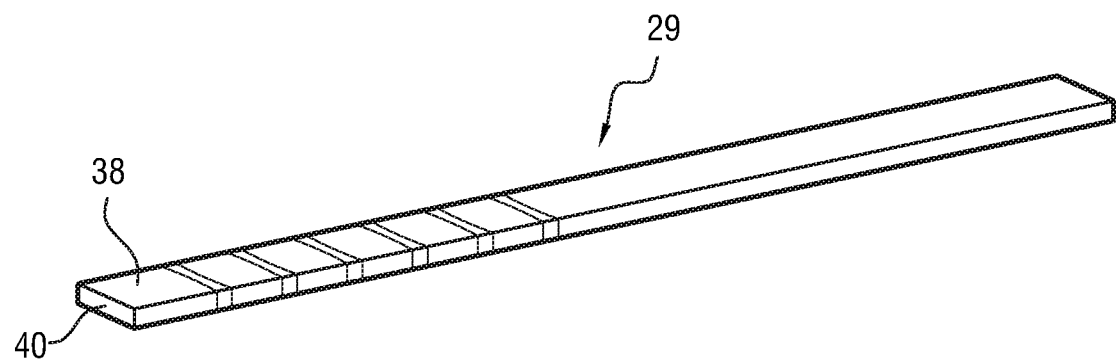
FIG. 8 is a view schematically illustrating the propagation of a guided wave in an armor element.

Each generation transducer 4 therefore creates, on the armor element 29 in which it is arranged, a guided ultrasonic wave, which propagates along the armor element 29, as illustrated by FIG. 8.

As indicated above, the wave is a Rayleigh wave propagating preferably on the surface of the armor element 29, and/or a Lamb wave propagating in the core of the armor element 29.

The guided ultrasonic wave propagates quickly over a distance greater than 1 m, in particular greater than 10 m and advantageously comprised between 10 m and 100 m.

During the passage in the armor element 29, if the wave encounters defects and/or obstacles, this creates a more or less abrupt impedance change, which may convert the incident propagation modes.

If the receiving transducer is separate from the generation transducer 4, the signal obtained after propagation is collected directly by the receiving transducer located remotely, without reflection of the signal.

Conversely, when the receiving transducer is made up of the generation transducer 4, the signal is reflected, for example upon passing by a defect, and/or at the end of the armor element 29, and the reflected signal is received by the generation transducer 4.

The signal received by the receiving transducer is collected by the signal receiver 98, then is processed by the processing computer 100.

Advantageously, the characteristic properties associated with each mode, such as the phase speed, the group speed, are calculated and are represented in the form of dispersion curves. The energy transported by guided ultrasonic wave is also measured in order to obtain energy balances between the incident waves and those reflected or transmitted after a defect.

As previously specified, in order to detect the modes that are present, a time-frequency representation can be calculated, by sliding a temporal window on the signal, and for each position of the window, by calculating the Fourier transform. The guided modes then appear in the form of specific zones in the time-frequency representation.

Alternatively, as previously indicated, a double spatiotemporal Fourier transform is done to obtain a representation as a function of the number of waves and the frequency that separates the modes that are present. This allows the comparison with the dispersion modes linking the numbers of waves and frequency, for an identification of the modes, and to determine any mode conversions related to the defects.

Alternatively, processing by wavelets is done, as indicated above.

It is thus possible to detect breaks, cracks and corrosion of armor elements 29 of the outer ply 25 and the inner ply 24 in the end fitting 2 or in the working length in the central section 12 up to a distance of several tens of meters, for example, under the stiffness.

The presence of water in the annular space up to a distance of several tens of meters can also be inspected.

The method according to the invention further makes it possible to assess the quality of the resin/armor interface of the outer ply 25 in the inner ply 24 in the end fittings 2.

Figure 9:
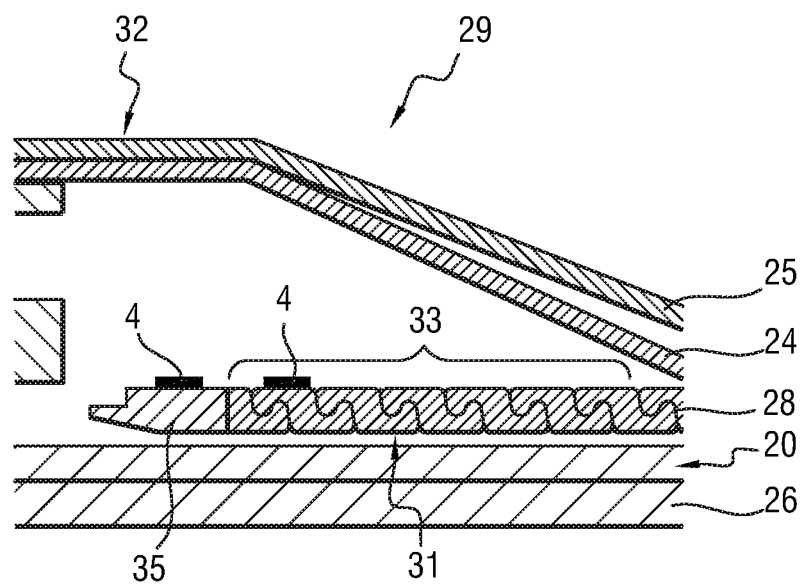
FIG. 9 is a view similar to FIG. 2 of a detail of another end fitting according to the invention.

In one alternative, shown in FIG. 9, at least one generation transducer 4 is mounted on a wire 31 of the pressure vault 28, in the receiving chamber 52 of the end fitting 2, and/or on the ring 35 located at the end of the wire 31.

It is then possible to transmit an acoustic signal in the form of a guided wave in the elongate element made up of a wire 31 of the pressure vault 28. It is thus possible to detect breaks, cracks on the wires making up the pressure vault 28.

Alternatively (not shown), at least one generating transducer 4 is mounted on a cleating wire, when such a cleating wire is present.

Figure 10:
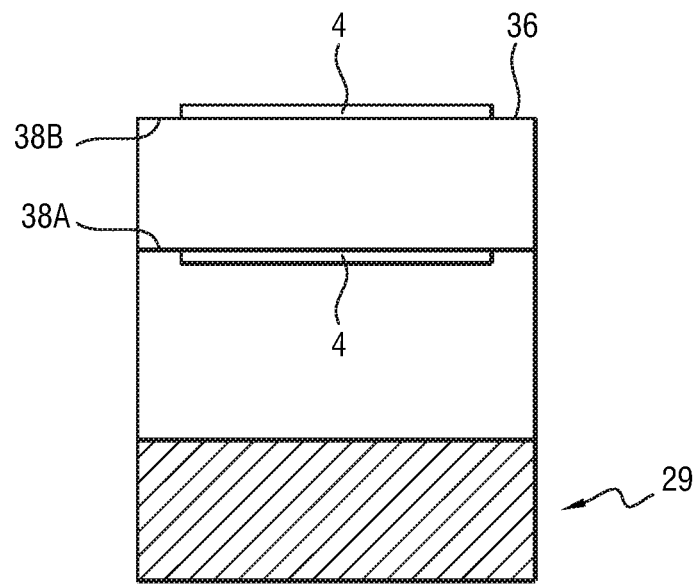
FIG. 10 is a sectional view of an end section of an armor element of the end fitting of FIG. 2, equipped with acoustic transducers according to one embodiment of the invention.
Figure 11:
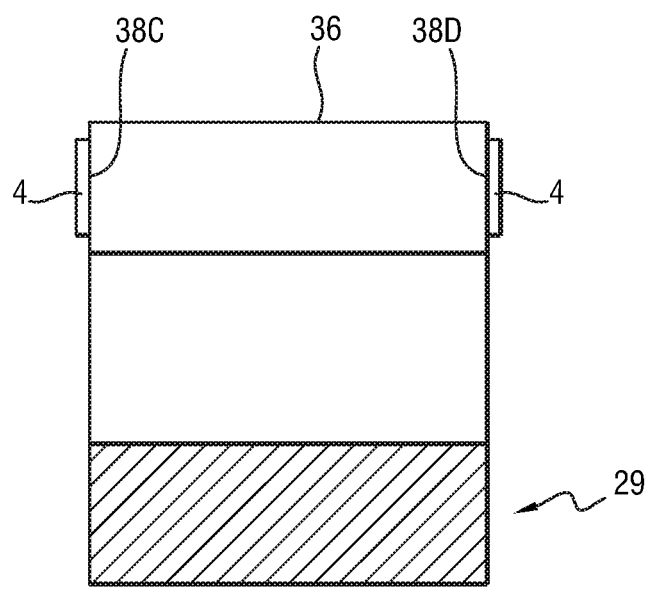
FIG. 11 is a view similar to FIG. 10 of another embodiment of the invention.

In preferred alternative embodiments of the invention illustrated in FIGS. 10 and 11, two transducers 4 are fastened in opposition, i.e., diametrically opposite, on opposite respective faces 38A, 38B; 38C, 38D of the armor element 29. Preferably, the transducers 4 are located on the attachment element 36, after its curved part, at its free end.

In an example illustrated in FIG. 10, a transducer 4 is fastened on the inner face 38A of the armor element 29 located across from the outer surface 60 of the end vault 50, while another transducer 4 is fastened on the outer face 38B of the armor element 29 located across from the inner surface of the cover 51.

In another example illustrated in FIG. 11, a transducer 4 is fastened on a side face 38C of the armor element 29, while another transducer 4 is fastened on the other side face 38D of the armor element 29.

One of the transducers 4 is a wave generation transducer, while the other diametrically opposite transducer is a receiving transducer for the waves generated in the armor element 29.

With this configuration in which the generation and receiving transducers 4 are fastened on the armor element 29 in a diametrically opposite manner, the frequency range or the energy necessary to generate wave trains in the armor element 29 is lower than for the other position configurations of the transducers 4 described above.

It is therefore possible to optimize the design of the transducers, i.e., to optimize their shape and/or size, in light of the desired performance.

Furthermore, this alternative embodiment of the invention makes it possible to uncouple the guided wave generation function from the reflected guided wave detection function, unlike the case where the generation transducer also performs the guided wave receiving function.

In this way, the main function of each transducer is optimized. For example, it is possible to improve the main detection function of the receiving transducer of the guided waves by increasing its detection sensitivity.

According to one particular embodiment of the invention, the at least one generation transducer 4 is positioned, then fastened on at least one armor element 29 of the outer armor ply 25 and/or the inner armor ply 24, in order to monitor the evolution of the integrity of the at least one armor element 29 in real time when the flexible line is in production.

In production, the flexible line is subject to longitudinal tensile forces, the majority of which are reacted by the armor elements 29, and more particularly at their end located in the chamber 52 delimited by the end vault 50 and the cover 51 of the connecting end fitting 2.

A study has been conducted by the Applicant in order to assess the likelihood of a wave being able to propagate in an armor element 29 subject to a tensile mechanical load.

To that end, several armor element specimens 29 on which generation transducers 4 are fastened beforehand are installed between the jaws of a tensile testing machine. The armor element 29 is pulled, or rather tensioned, at regular time intervals. The tensile force applied to the armor element 29 is such that the latter stretches by a given length. Once the armor element is elongated by the desired length representative of what a tensile armor wire is brought to when the pipe is in use, a pulse is then generated through the armor element 29. One then observes how the wave train moves along the armor element 29.

To that end, the Applicant was able to observe that the generation of pulses through the armor elements 29 subject to the tensile forces does not affect the wave train transmission. The fact that the armor element 29 has been stretched and that the microstructure has therefore been modified does not prevent the wave train from circulating along said armor element 29.

However, this remains valid in the case where the armor elements 29 are pulled to their maximum elastic limit. In the case where the armor element 29 has been pulled beyond this limit and has therefore been plasticized, the generated pulse does not make it possible to transmit the wave train over the entire length. The wave train is therefore greatly attenuated at the plasticized zone.

Depending on the propagation mode and/or the excitation frequency of the guided waves generated in the armor element 29, the amplitude of the guided waves can be unchanged or, on the contrary, modified, i.e., larger or smaller.

Furthermore, the propagation mode and/or the excitation frequency of the guided waves generated in the armor element 29 can also influence their propagation speed. Their speed can be accelerated, or on the contrary, slowed when they encounter the zone of the armor element 29 that has been mechanically stretched.

Conversely, when the armor elements 29 have been mechanically stretched to their plasticizing domain, the generated guided waves are not transmitted to the entire length of the armor element 29. They are greatly attenuated, or even stopped by the zone of the armor element 29 that has been mechanically stretched to plasticizing.

As a result, aside from monitoring the integrity of the armor elements 29 in order to detect cracks and/or breaks as well as corrosion (losses of thickness), this measuring method also enables the real-time verification of the elongation experienced by each of the armor elements 29 when the flexible line is in production.

Figure 12:
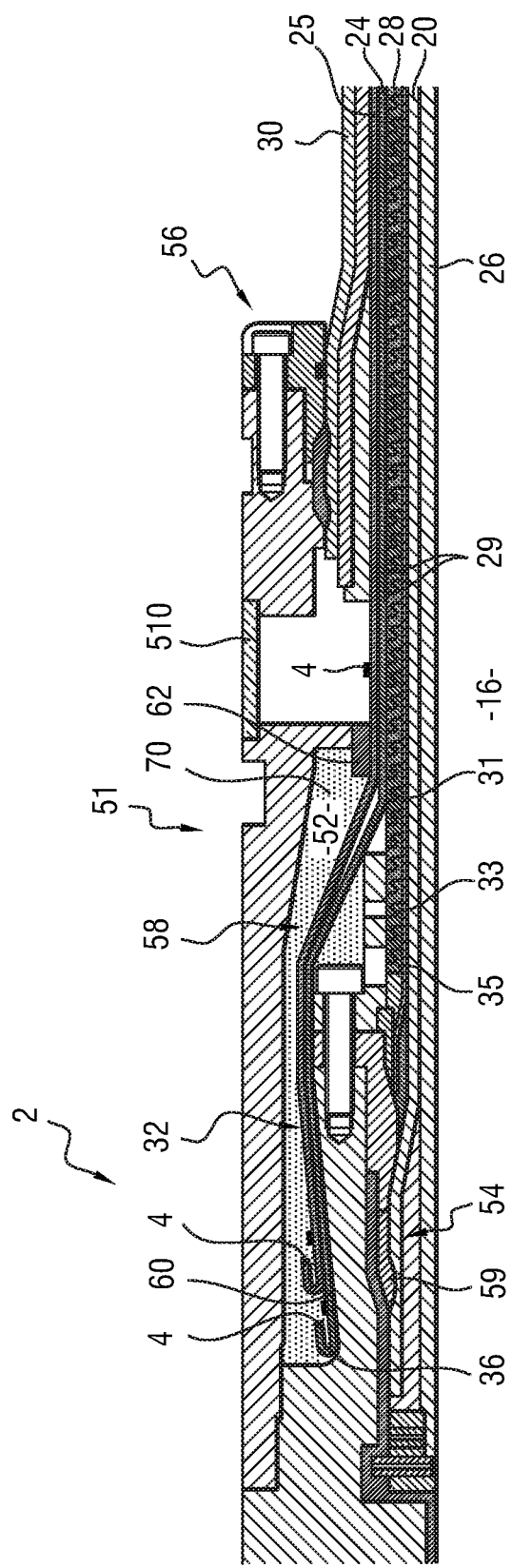
FIG. 12 is a view similar to FIG. 2 of another end fitting according to the invention.

FIG. 12 shows another connecting end fitting 2 of the flexible line 10 according to the invention. This end fitting 2 comprises, in its rear part, a visual inspection window 510 arranged in the thickness of the cover 51. Such a window 510 is for example described in international application WO2016/042487 filed by the Applicant. The window 510 is placed across from at least one armor element 29 of the outer armor ply 25 and/or a rear blocking collar 62 of the or each armor element 29.

The presence of the visual inspection window 510 allows access to the outer armor ply 25 of the flexible line 10. Thus, aside from being able to perform visual and real-time monitoring of the mechanical integrity of the armor wires, the window 510 advantageously offers the possibility of positioning, then fastening generation transducers 4 on each of the wires making up the outer armor ply 25 in order to inspect and detect, in real-time, crack and/or break onset within the armor wires.

Furthermore, the implementation of the generation transducers 4 also makes it possible to detect flooding of the annular space of the line 10 behind the end fitting 2, as well as the possibility of one or several armor wires being corroded.

Preferably, the implementation of the generation transducers 4 on the armor wires of the outer armor ply 25 is done during manufacturing of the flexible line. However, the implementation of the transducers 4 can also be done later, before installing the line in the body of water, or even after commissioning.

The invention claimed is:

1. A connection end fitting of a flexible line, the flexible line comprising at least one tubular sheath and at least one elongate element arranged around the tubular sheath, the end fitting comprising:
    an end part of the tubular sheath;
    an end section of each elongate element;
    an end vault and a cover defining a chamber for receiving each end section; and
    at least one generation transducer configured for generating an ultrasonic wave guided in the elongate element, the at least one generation transducer being placed on the elongate element in the receiving chamber, the at least one generation transducer having a volume of less than 200 mm$^3$,
    wherein the flexible line comprises at least one armor ply, the elongate element being an armor element of the armor ply,
    wherein the guided ultrasonic wave propagates longitudinally in a working length of a central section of the flexible line outside the end fitting in order to detect its defects,
    wherein the working length of the flexible line is a length of the flexible line that extends beyond the end fitting.

2. The end fitting according to claim 1, wherein the at least one generation transducer has a thickness, considered relative to the sheath, of less than 2 mm.

3. The end fitting according to claim 1, including a filler material filling the receiving chamber, the filler material being in contact with the end section of the elongate element and covering the at least one generation transducer.

4. The end fitting according to claim 1, wherein the flexible line comprises at least one inner armor ply and at least one outer armor ply, the end fitting comprising at least one inner end section of at least one armor element of the inner armor ply, and at least one outer end section of at least one armor element of the outer armor ply,
    the end fitting comprising a first generation transducer of a guided ultrasonic wave applied on the inner end section, and a second generation transducer of a guided ultrasonic wave applied on the outer end section.

5. The end fitting according to claim 1, wherein the at least one generation transducer is glued on the end section of the elongate element.

6. The end fitting according to claim 1, wherein the at least one generation transducer is covered by a layer of protective material with a thickness of less than 50% of the thickness of the at least one generation transducer.

7. The end fitting according to claim 1, wherein the end section of the elongate element comprises at least one side face and at least one edge located at the free end of the end section, the at least one generation transducer being applied on the side face and/or on the edge.

8. The end fitting according to claim 1, wherein the end section of the elongate element comprises a hook, twist and/or wave, the at least one generation transducer being located on the hook, twist and/or wave.

9. The end fitting according to claim 8, wherein the at least one generation transducer is fastened on a planar surface.

10. The end fitting according to claim 1, including several end sections of separate elongate elements, the end fitting further comprising several generation transducers configured to generate a guided ultrasonic wave, each generation transducer being applied on a separate elongate element.

11. The end fitting according to claim 1, wherein the at least one generation transducer is able to emit a guided ultrasonic wave with a frequency comprised between 10 kHz and 5 MHz.

12. The end fitting according to claim 1, wherein the at least one generation transducer is chosen from among a piezoelectric transducer, a piezoelectric membrane transducer, a variable-angle transducer, an interdigital transducer, an excited comb transducer, an EMAT transducer and/or a magnetostrictive effect transducer.

13. The end fitting according to claim 1, wherein a visual inspection window is arranged in the thickness of a rear part of the cover, across from at least one elongate element and/or a rear blocking collar of the at least one elongate element.

14. The end fitting according to claim 1, wherein the at least one generation transducer has a volume comprised between 20 mm$^3$ and 50 mm$^3$.

15. The end fitting according to claim 1, wherein the at least one generation transducer has a thickness, considered relative to the sheath, of less than $\frac{1}{10}$ mm.

16. The end fitting according to claim 1, wherein the at least one generation transducer is able to emit a guided ultrasonic wave with a frequency comprised between 50 kHz and 500 kHz.

17. A device for measuring the integrity of an elongate element in a flexible line, comprising:
    a connection end fitting of a flexible line, the flexible line comprising at least one tubular sheath and at least one elongate element arranged around the tubular sheath, the end fitting comprising:
    an end part of the tubular sheath;
    an end section of each elongate element;
    an end vault and a cover defining a chamber for receiving each end section;
    at least one generation transducer configured for generating an ultrasonic wave guided in the elongate element, the at least one generation transducer being placed on the elongate element in the receiving chamber, the at least one generation transducer having a volume of less than 200 mm$^3$; and
    at least one receiving transducer configured for receiving the guided ultrasonic wave emitted by the at least one generation transducer, a signal generator, connected to the at least one generation transducer and a signal detector, connected to the at least one receiving transducer,
    wherein the flexible line comprises at least one armor ply, the elongate element being an armor element of the armor ply,
    wherein the guided ultrasonic wave propagates longitudinally in a working length of a central section of the flexible line outside the end fitting in order to detect its defects, and
    wherein the working length of the flexible line is a length of the flexible line that extends beyond the end fitting.

18. The device according to claim 17, wherein the at least one receiving transducer is formed by the at least one generation transducer.

19. A method for measuring the integrity of at least one flexible line, comprising:
    providing a device for measuring the integrity of an elongate element in a flexible line, the device comprising, a connection end fitting of a flexible line, the flexible line comprising at least one tubular sheath and at least one elongate element arranged around the tubular sheath, the end fitting comprising:

an end part of the tubular sheath;

an end section of each elongate element;

an end vault and a cover defining a chamber for receiving each end section;

at least one generation transducer configured for generating an ultrasonic wave guided in the elongate element, the at least one generation transducer being placed on the elongate element in the receiving chamber, the at least one generation transducer having a volume of less than 200 mm$^3$; and at least one receiving transducer configured for receiving the guided ultrasonic wave emitted by the at least one generation transducer, a signal generator, connected to the at least one generation transducer and a signal detector, connected to the at least one receiving transducer;

wherein the flexible line comprises at least one armor ply, the elongate element being an armor element of the armor ply, wherein the guided ultrasonic wave propagates longitudinally in a working length of a central section of the flexible line outside the end fitting in order to detect its defects, and wherein the working length of the flexible line is a length of the flexible line that extends beyond the end fitting;

the method further comprising, generating a guided wave using the at least one generation transducer in an elongate element of the flexible line;

receiving a signal captured by the at least one receiving transducer of the elongate element;

processing the received signal to determine the presence of defects in the elongate element.

* * * * *